United States Patent

[11] 3,579,963

| [72] | Inventor | Colonel Henry<br>Lawton, Iowa 51030 |
|---|---|---|
| [21] | Appl. No. | 841,052 |
| [22] | Filed | July 11, 1969 |
| [45] | Patented | May 25, 1971 |

[54] ANIMAL HALTERS
3 Claims, 8 Drawing Figs.

| [52] | U.S. Cl. | 54/24 |
|---|---|---|
| [51] | Int. Cl. | B68b 01/02 |
| [50] | Field of Search | 54/24 |

[56] References Cited
UNITED STATES PATENTS

| 3,273,311 | 9/1966 | Henry | 54/24 |
|---|---|---|---|
| 3,407,568 | 10/1968 | Henry | 54/24 |
| 3,418,787 | 12/1968 | Smith | 54/24 |

*Primary Examiner*—Aldrich F. Medbery
*Attorney*—Lucas J. DeKoster

ABSTRACT: Animal halters constructed of a braided hollow-core line are described. One form of halter having a locking piece in the nosepiece for locking the sidepieces to the nosepiece without requiring hardware clamps is described. Other halter embodiments interwoven from segments of braided hollow-core line, are also described.

PATENTED MAY 25 1971

INVENTOR.
COLONEL HENRY

BY
Orrin M. Haugen
ATTORNEY

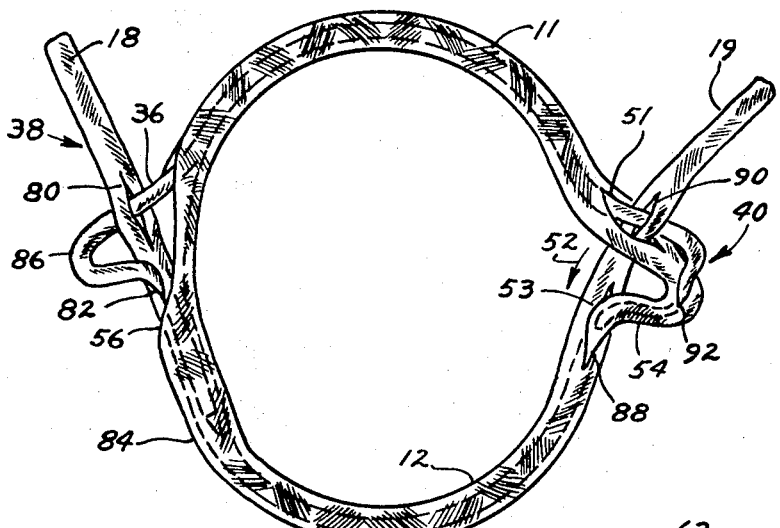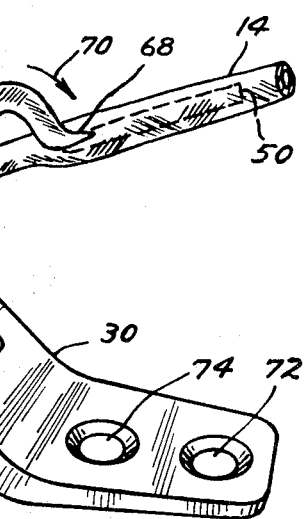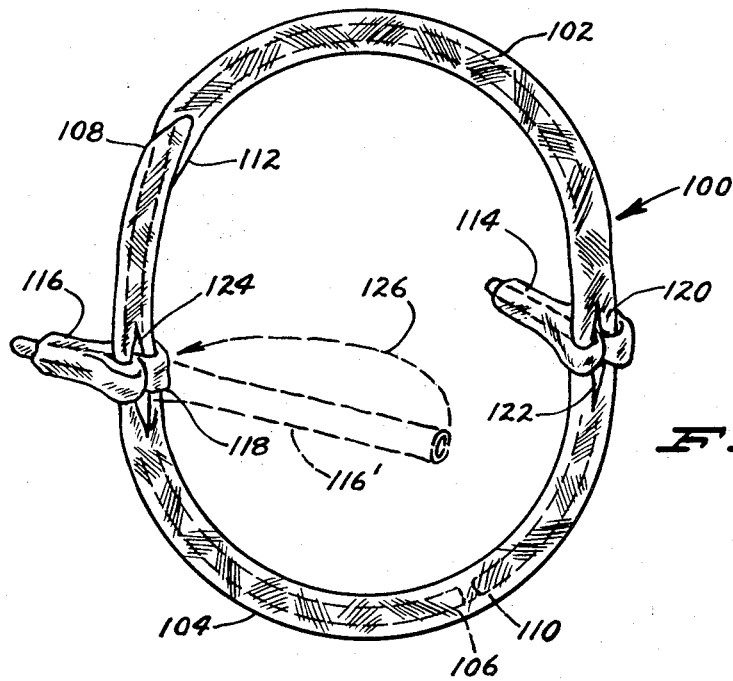

PATENTED MAY 25 1971
3,579,963
SHEET 3 OF 3
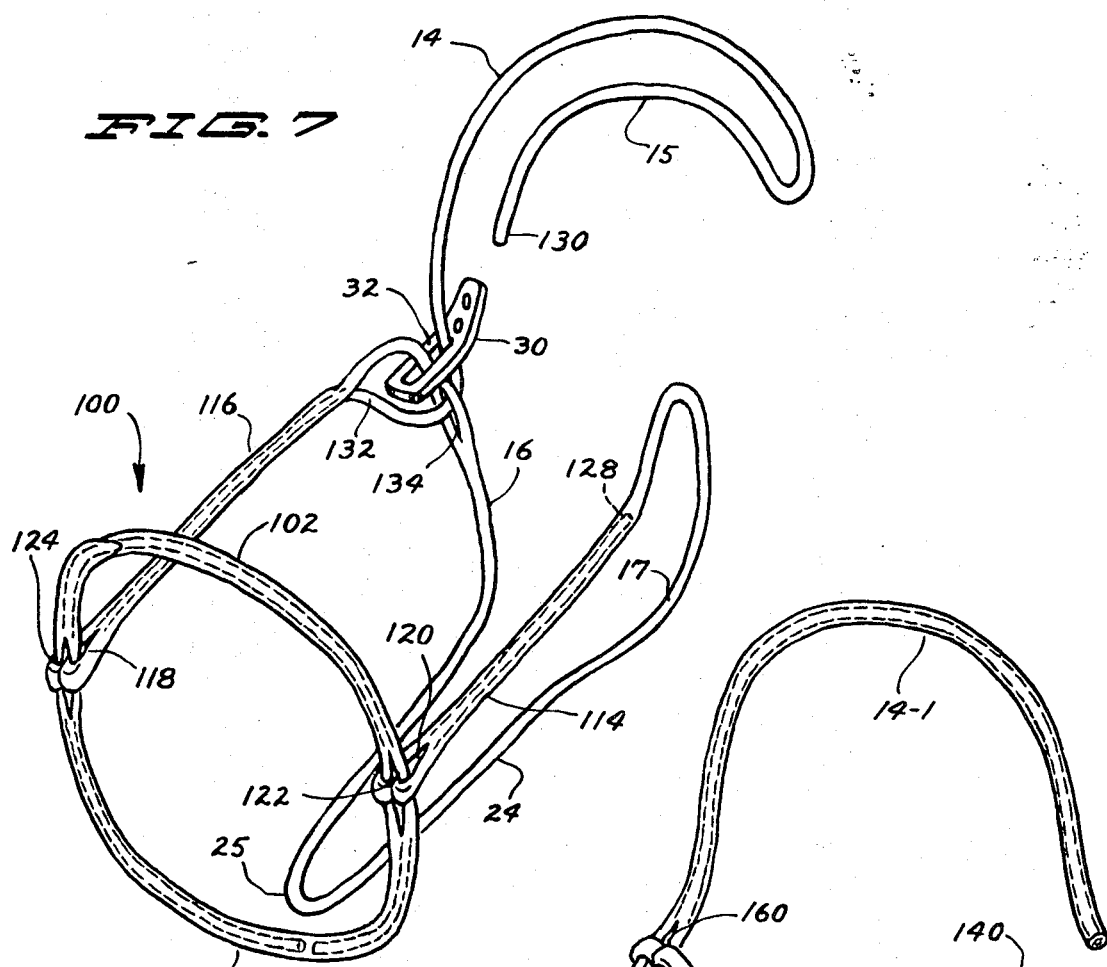
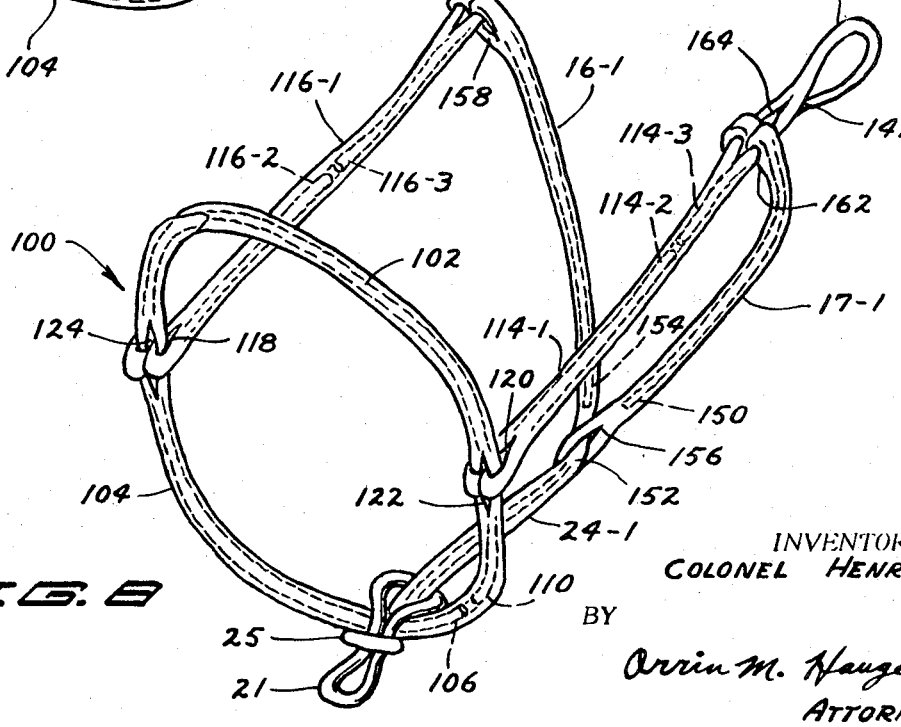
INVENTOR.
COLONEL HENRY
BY
Orrin M. Haugen
ATTORNEY

ANIMAL HALTERS

BACKGROUND OF THE INVENTION

1. Field of the Invention

This invention relates generally to the field of animal halters. More specifically, this invention relates to improved animal halters of the type fabricated from interwoven lengths of braided hollow-core line.

2. Description of the Prior Art

Many early types of animal halters were constructed of leather straps riveted or sewn to appropriately located hardware elements. Halters of this type are relatively expensive to manufacture; and, generally speaking, are sized for a particular size animal. Further, halters of this type are particularly sensitive to moisture, tending to stiffen and crack when exposed to moisture and dried over repeated periods of time, and tending to mildew and rot when kept in a damp atmosphere. Since the advent of high-strength braided hollow-core synthetic line, it was found that it was possible to fabricate animal halters which would be substantially immune to such problems as cracking and decay. In the preparation of animal halters, it is normally necessary for the manufacturer to stock several sizes and weights of halters. In this connection, the production technique normally required that the several sizes and weights of halters be simultaneously produced. Any departure from this production routine would place an undue requirement and burden upon inventory of component parts. In addition, the various sizes and weights of conventional prior art halters may require various types of hardware, each being distinct from the other. Therefore, the inventory of these components places an additional economic burden on the manufacturer.

In any animal halter, the greater wear occurs in the areas of high stress, which frequently are at the juncture of the nosepiece and the interconnecting sidepieces between the nosepiece and the headpiece. It is in this general area where the greatest amount of strain is present between the individual components of the halter; and, accordingly, the greatest amount of wear and danger from breakage occurs here. When these juncture points employ hardware, such as for example, a metallic juncture element, these points normally will form one of the weakest areas in the halter assembly. This follows since the metallic juncture elements and the material from which the halter is constructed are not of matching durability such that the halter material normally fails due to a concentration of stresses or abrasions in these junction areas. It has been recognized in the prior art that it is possible to fabricate an animal halter utilizing a single length of line, interwoven through itself to such an extent that no external hardware is needed. Such halters are satisfactory, but require substantial interweaving of the entire length of line for the halter, thereby tending to make the manufacturing process quite time consuming, and requiring substantially more braided hollow-core line than the instant invention. Yet other types of prior art animal halter have recognized that it is possible to fabricate an animal halter utilizing braided hollow-core line, but resulted in only a single thickness of line for the nosepiece.

SUMMARY

In summary, then, the animal halters of this invention comprise animal halters constructed of interwoven braided hollow-core line, preferably hollow-core synthetic line which can be woven through itself so that hardware is not required at the juncture of the nosepiece to the sidepieces, with interwoven line joining the nosepiece to the sidepieces without permitting any slippage therebetween. The animal halters of this invention utilize a minimum of conventional hardware items that can be adapted for all sizes of halters, thereby eliminating a majority of the interweaving required by prior art animal halters constructed of a single length of braided hollow-core line woven through itself. The hardware is located at points of minimum stress. Additionally, in one embodiment substantially less hollow-core line is required in the instant invention over that of the prior art line arrangements. Use of line prepared from synthetic fibers, such as nylon, polyethylene, or the like, is particularly adaptable to animal halters. In this regard, the line is both rot resistant and generally waterproof. Furthermore, the line is dimensionally stabile, has a minimum stretch characteristic, and is generally preferable over conventional rope or leather halter elements, or the like.

A primary object of this invention, then, is to provide improved animal halters utilizing braided hollow-core line together with a minimum of hardware. It is yet another object of this invention to provide improved animal halters prepared from individual lengths of hollow-core braided synthetic fibers with various portions of the line being enclosed within other portions of the line in order to provide an interwoven structure. Still another object of this invention is to provide an improved animal halter prepared from a single length of hollow core braided line wherein the nosepiece is formed with a portion of the line looped and enclosed within itself, with a locking piece extending through the portion of the nosepiece that is of a single line characteristic, for locking the sidepieces to the nosepiece.

Yet another object of this invention is to provide improved animal halters having interwoven nosepieces. A further object of this invention is to provide improved animal halters having interwoven nosepieces joined by interweaving to sidepieces, the interweaving including enclosing portions of the sidepiece lines within themselves. Still a further object of this invention is to provide an improved animal halter prepared from individual lengths of hollow-core braided line wherein the nosepiece is formed from a first length of line looped and having portions enclosed within itself for forming a double-strength nosepiece, a second length of line forming one of the sidepieces and interwoven through one side of the nosepiece, with a portion forming a connection loop displaced from the nosepiece by having an end portion enclosed within itself, a third length of line forming the other sidepiece and the upper portion of the headpiece, and interwoven through the other side of the nosepiece, the end portions both enclosed within itself, and a fourth length of line forming a yoke and the lower portion of the headpiece, the fourth length having a first portion interwoven through the first sidepiece near the connection loop for locking the loop and a second portion interwoven through the other sidepiece for locking the upper portion of the headpiece thereby forming the lower portion of the headpiece, and having a third portion interwoven with itself for forming the yoke. Other and more detailed objects and purposes of the invention will become apparent to those skilled in the art upon a consideration of the following description of the preferred embodiment when viewed in light of the accompanying drawings.

BRIEF DESCRIPTION OF THE DRAWINGS

FIG. 3 is a detailed fragmentary view of a short length of braided hollow-core line showing one portion enclosed within a second portion; FIG. 4 is an expanded view of one embodiment of a nosepiece and illustrates the locking piece interwoven through the sidepiece for locking the sidepieces to the nosepiece for one embodiment; FIG. 5 is an expanded view of the locking arrangement of the sidepiece to the length-adjusting buckle; FIG. 6 illustrates an alternative type nosepiece and the interwoven junctures to the sidepieces; FIG. 7 illustrates an alternative embodiment of an animal halter utilizing the nosepiece of FIG. 6; and FIG. 8 illustrates yet another embodiment of an animal halter utilizing the nosepiece of FIG. 6, but with only the link hardware required, all of the other interconnection points being interwoven.

DESCRIPTION OF THE PREFERRED EMBODIMENTS

Figure 1:
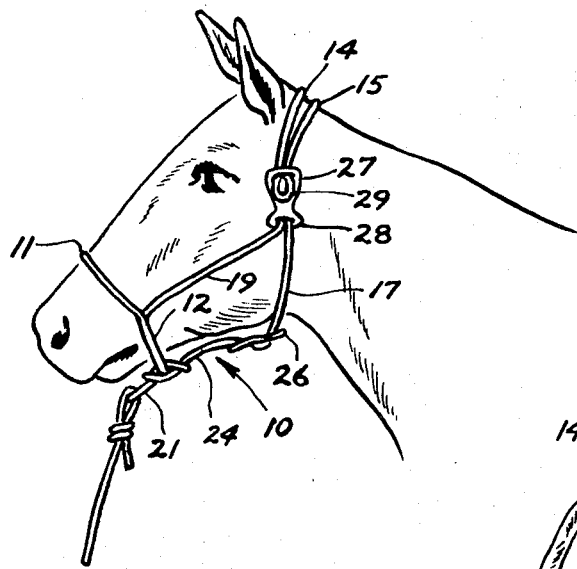
FIG. 1 is a side view of the head and neck portion of a horse fitted with a halter prepared in accordance with the present invention.
Figure 2:
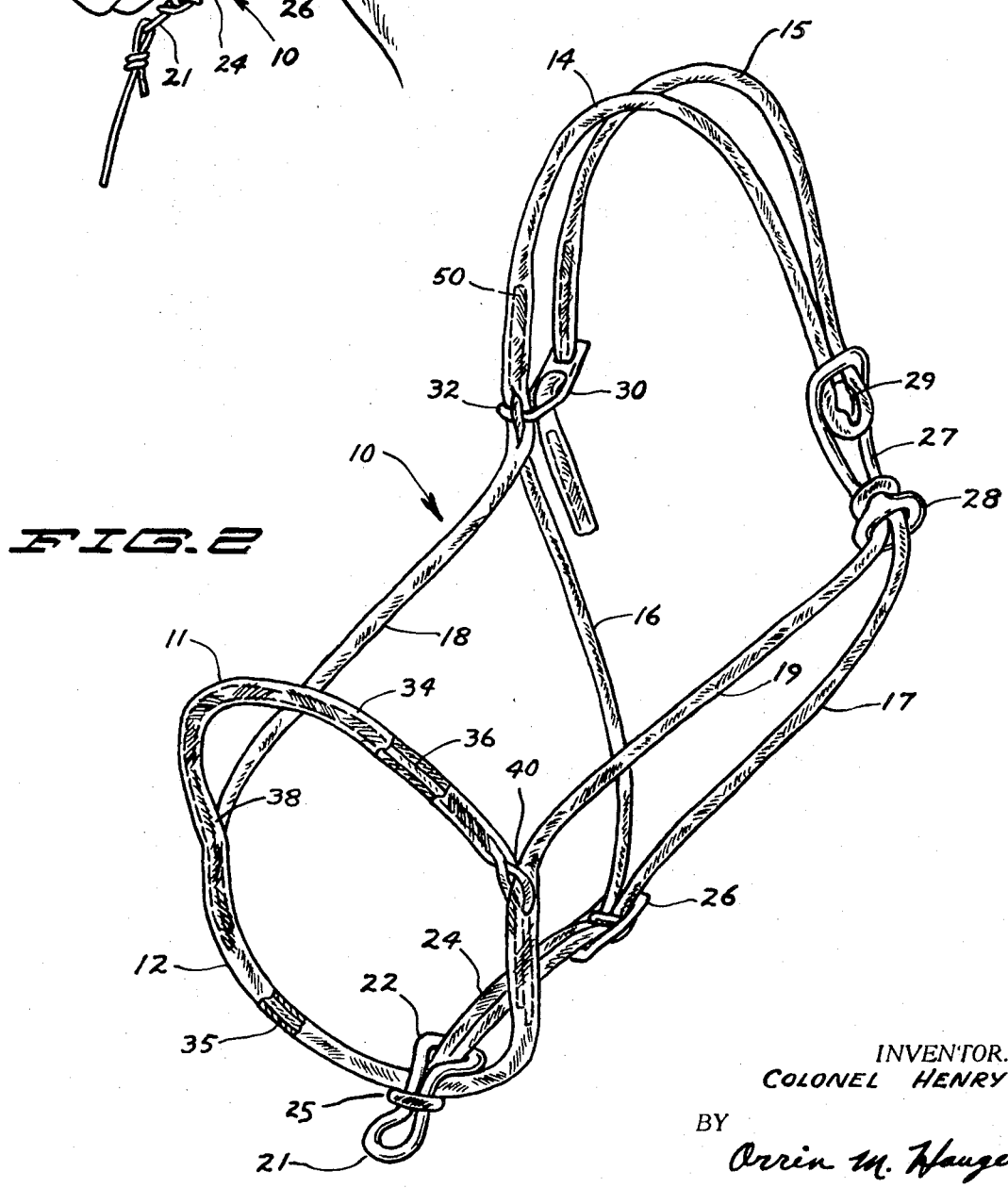
FIG. 2 is an enlarged perspective view of one embodiment of a halter prepared in accordance with the present invention, and illustrates the winding and weaving technique utilized to form the halter with a minimum requirement of external hardware for securing the various portions of the halter together.

In accordance with one embodiment of the invention, invention, the animal halter generally designated 10, as shown in FIGS. 1 and 2, comprises a nosepiece including an upper segment 11 and a lower segment 12, a headpiece with a pair of upper segments 14 and 15, together with a pair of lower segments 16 and 17, the headpiece and the nosepiece being coupled together generally by lateral sidepieces 18 and 19. In order to conveniently apply a lead rope to the animal through the halter 10, a figure 8 link 21 is provided, with link 21 having a conventional pair of openings or eyes at opposite ends thereof, together with a central closed shank portion or area therebetween. The rear open portion, as shown at 22, is adapted to receive two widths of line, such as yoke 24, these line portions being continuous and forming loop 25 for engaging link 21. Link 21 is conventionally metal or some other hard material, thereby accommodating the use of snaps or the like at the ends of lead ropes. Only a bare minimum of external hardware is required in the halter 10 of the present design. In this connection, the assembly utilizes a slideable adjusting member 26, in order to control the size and disposition of the headpiece and the length of yoke 24. In addition, an anchor member 27, including an eyelet portion 28 together with a lock, hook or claw 29 is utilized. The eyelet portion 28 operates as an anchor for the integral juncture loop between the lateral sidepiece 19 and the lower headpiece portion 17, while the upper portion including the claw member 29 operates to provide an anchoring point for the upper headpiece portions 14 and 15. The only other hardware required is the adjusting buckle 30, which is fixed by interweaving sidepiece 18 and the end of portion 16 of the lower part of the headpiece around connecting element 32. The adjusting buckle 30 operates as an anchor terminal point for the free end of portion 15 of the headpiece. The nosepiece 11, 12 comprises an outer portion or loop 34 of braided hollow-core line and an inner portion 35 of the braided hollow-core line. In the construction, which will be discussed in more detail below, it will be seen that the inner line 35 extending through the lower portion 12 of the nosepiece comprises an inner partial loop and is a part of the continuous length of line. The inner line 36 in the upper portion 11 of the nosepiece is a separate locking piece that is interwoven at the ends at junctures 38 and 40. FIG. 3 illustrates in cross-sectional view the inner line 36 extending through the hollow-core portion of line 34.

In preparing the animal halter 10 of the present invention, the operator initially cuts the length of braided hollow-core line from a supply roll, the length being adequate to prepare the size of halter desired. For a normal size horse, for example, a length of 12 to 15 feet in length will be adequate. The locking piece 36 will be described below. With particular attention directed to FIG. 2 of the drawing, it will be seen that the initial operation starting at end 50 is to measure the desired length of portion 16 to the coupling 26. This length characteristically will be in the order of 12 inches. The portion 16 is passed through the coupling 26 and loop 24 is formed. The length of each leg of loop 24 will be characteristically 9 inches. The free end is passed through the coupling 26 and forms the lower portion 17 of the headpiece. The length of lower portion 17 will be characteristically 9 inches to the point of passing through the eyelet 28. The line is then extended along sidepiece 19 a distance of approximately 9 inches through the juncture point 40. At this point, the line is grasped and an outer loop comprised of segments 12 and 11 is formed by forming a loop back on itself. Characteristically, 24 inches of line will be utilized for forming the outer loop. The outer loop is formed by passing the end portion of sidepiece 19 through the opening 51 made through the braiding of upper portion 11. This is done by passing line through in the direction of arrow 52. Having thus passed through opening 51, an opening 53 is made in the lower portion 12 by separating the braiding to expose the hollow-core. The line at the portion 54 is inserted through the opening 53 and threaded through the lower portion 12 to the juncture 38, thereby forming inner partial loop 35, where another opening 56 allows the line to extend therethrough and form into sidepiece 18. See FIG. 4.

Returning again to FIG. 2, the length of sidepiece 18 is in the order of 9 inches to the coupling point to adjusting buckle 30. At this time, attention is directed to FIG. 5 wherein the coupling of adjusting buckle 30 to the halter is illustrated in a spread-apart relationship. At this time it will be recalled that the end 50 (see FIG. 2) is still free. At the woven juncture point of sidepiece 18 and lower piece 16, the sidepiece 18 is separated to form opening 60 and the free end 50 is passed therethrough. A second opening 62 is then formed in line 16 and the other end of the line is passed therethrough. A loop 64 is passed through the coupling portion 32 of adjusting buckle 30. Another opening 66 is made through the line that terminates in end 50 and the long line is passed therethrough. Yet another opening 68 is formed in top portion 14 with the braiding being separated to expose the hollow-core and the end 50 inserted therein in the direction of arrow 70. The end 50 is then threaded into the core until the loops are brought together. When these interweavings have been made, pressure is applied in the direction of arrow 71, and on each of the lines for pulling the loops into an interwoven tightly arranged relationship for providing a smooth pleasing appearance to that portion of the halter. The remainder of the loose end extending beyond end 50 is then formed into an integral loop for forming upper portions 14 and 15, and threaded back through the retaining holes 72 and 74, as shown in FIG. 2.

Having thus constructed a major portion of the halter 10, it is necessary only to insert the locking piece 36 in the upper portion 11 of the nosepiece. The locking piece is constructed of a length of braided hollow-core line 36 which has a length of approximately half the circumference of the nosepiece plus approximately 6 inches. In the formation of the woven interconnections at junctures 38 and 40, attention is directed to FIG. 4. It can be seen that openings 80 and 82, with opening 80 being entirely through the sidepiece 18 and the opening 82 being opened only to the inner core thereof, are formed. The end 84 of locking piece 36 is inserted through opening 82 and threaded a distance into the core of the inner line 35 in the lower portion 12 of the nosepiece. Loop 86 is formed and the long piece of locking piece 36 is passed through opening 80 and into the hollow-core portion of the upper portion 11 of the nosepiece. The locking piece is threaded through the entire upper portion 11 of the nosepiece until end 88 is brought out through opening 51. An opening 90 is made entirely through sidepiece 19 and the end 88 passed therethrough. An opening 92 is made in the line comprising the outer portion of the upper piece 11 of the nosepiece and the end 88 inserted therein, and threaded into the hollow-core portion thereof. The illustration of FIG. 4 is in spread-apart relationship to illustrate the interweaving arrangements, and it being understood that in the final completed form would be pulled together to form a smooth and physically attractive nosepiece. When so woven together, and pulled down tight, the junctures 38 and 40 become smooth interwoven connections at the point of greatest stress in the animal halter, and provide an improved inner connection that is free from any slippage without the requirement of any hardware.

It is of course apparent, that in the formation of the nosepiece, the upper portion 11 can be formed from the continuous line with the locking piece 36 being woven through the lower portion 12 of the nosepiece. While this alternative arrangement can be utilized, the relationship described in detail above is preferred for having the various elements of the halter form a natural relationship for fitting on the head of the animal.

It will be of course apparent to those skilled in the art that various other changes in the formation of the halter can be made using similar techniques; and, in particular, other sizes of horse halters may be prepared by using a somewhat similar technique but with variations in the lengths of the various elements.

For an ordinary mature horse, braided polyethylene, braided hollow-core rope having a core diameter of between three-eighths and nine-sixteenths inch has been found suitable. Such line has a test strength of about 2000 lbs. or more, and lines of this type are commercially available.

In FIG. 6 there is shown an alternative arrangement for a nosepiece 100 having an upper portion 102, and a lower portion 104. This alternative nosepiece 100 is comprised of a unitary length of line with end 106 being inserted in opening 108 and threaded around the inner core, and end 110 being inserted in opening 112 and threaded around, thereby forming a unitary nosepiece comprised of a single piece of line and having double strength. During the formation of the nosepiece 100, the nosepiece line is passed through the lines of a pair of sidepieces 114, and 116, as shown most clearly by the dashed line illustration of the end 116' of sidepiece 116. It can be seen that the nosepiece 100 passes through openings 118 and 120. Having thus passed through, the sidepieces 114 and 116 are firmly locked thereto, by interweaving the free ends thereof back through nosepiece openings 122 and 124, respectively, thereby forming a pair of interwoven juncture points. This can best be understood by considering the dashed line portion 116' and recognizing that the end thereof is moved in the direction illustrated by dashed arrow 126 for insertion through opening 124, where the free end is then threaded back into the core of sidepiece 116, and forms a part thereof. A similar woven interconnection is performed for sidepiece 114. The interrelationship of these elements will be more clearly understood from the following discussion of alternative embodiments of the invention.

In FIG. 7 there is shown an alternative embodiment of the improved animal halter utilizing the nosepiece illustrated in FIG. 6. The portion of the halter that relate to similar portions in FIG. 2, will have the same reference numerals. The link 21, the adjusting member 26, and the anchor member 27 (see FIG. 2) are not shown, but it is understood that these, or other equivalent arrangements, could be used. The animal halter shown in FIG. 7 is formed by selecting a length of line sufficient to make the size halter desired. During the formation of the nosepiece 100, as described above, a length sufficient for forming the sidepiece 114 is measured from end 128, thereby locating opening 120; and a length is selected as required to make lower portion 17, yoke 24, lower portion 16, and the outer portion of sidepiece 116, thereby locating opening 118. End 130 is passed through opening 32 in adjusting buckle 30, and the nosepiece passed through opening 118. The nosepiece is then made, as described with relation to FIG. 6. Having thus formed the nosepiece, end 128 is woven back through opening 122, thereby completing the formation of sidepiece 114. Similarly, end 130 is woven back through opening 124, and extends for the distance of sidepiece 116, where the end 130 is taken out through opening 132, passed through opening 134 in lower-portion 16 for forming an interwoven juncture for securing adjusting buckle 30, and terminates in upper portions 14 and 15 of the headpiece. The juncture of sidepiece 116 and lower portion 16 is shown spread apart for ease of understanding, it being understood that this juncture would be pulled tightly together and formed into a smooth interwoven piece of the halter. Having thus constructed the portion of the halter comprised of the braided line, it is only necessary to attach the hardware mentioned above. It should be pointed out, that by the utilization of interweaving at the juncture of sidepiece 114 and lower portion 17 for forming a loop, and the interweaving of yoke 24, that only link 21 would be required to complete the halter. For such an arrangement adjusting buckle 30 could also be eliminated.

Turning now to a consideration of FIG. 8, there is shown yet another embodiment of this invention that utilizes the nosepiece 100 illustrated and described in FIG. 6. This embodiment does not make use of the hardware such as the adjusting buckle 30, the adjusting member 26, or the anchor member 27, but characteristically does include link 21. The halter embodiment shown in FIG. 8 is comprised of four individual lengths of braided line, each interwoven with itself, and with others of the lines. Portions of the halter that have elements similar to those described above, will bear the same reference numerals with a dashed distinguishing numbers.

The formation of nosepiece 100 is accomplished using a first length of line in a manner similar to that described above. A second length of line is selected of approximately twice the length of sidepiece 116-1 and upper portion 14-1. During the formation of the nosepiece, the line is inserted through openings 118. The free end 116-2 is fed back into the inner core of sidepiece 116-1, thereby forming one of the interwoven junctures. At the same time, a third length of line of approximately twice the length of sidepiece 114-1, plus about 4 to 6 inches, is selected. The nosepiece line is passed through opening 120. The free end 114-2 is fed back through opening 122 to the inner core of sidepiece 114-1, thereby forming a second of the interwoven junctures.

To complete sidepiece 116-1 the free end 116-3 is woven back through itself until it meets end 116-2 in the core of sidepiece 116-1. In a similar manner sidepiece 114-1 is completed by forming loop 140 by inserting end 114-3 in opening 142, and threading it back until it meets end 114-2.

To form the lower headpiece portions 16-1 and 17-1 and yoke 24-1, a fourth length of line is selected. The length of line is divided approximately in half and loop 25 is formed for engaging link 21. End 150 is threaded into the inner core of yoke 24-1 through an opening (not shown) under link 21. End 150 extends to the juncture of yoke 24-1 and lower portions 16-1 and 17-1, where it extends out through opening 152. End 154 of the outer line of yoke 24-1, is still free at this time, and is extended through opening 156, thereby forming an interwoven juncture.

Lower portion 16-1 is then formed by passing the free end of upper portion 14-1 through opening 158. The free end 154 is then woven back through opening 160, and threaded through the inner core or lower portion 16-1 to the juncture with yoke 24-1. In a similar manner lower portion 17-1 is formed by passing loop 140 through opening 162 while end 150 is still extended. This end 150 is then woven back through opening 164 and threaded through the inner core of lower portion 17-1 to the juncture with yoke 24-1.

In this last embodiment, all of the halter interconnections are interwoven, with the exception of the coupling to link 21, and all of the halter elements are comprised of a double lines, each having one line threaded back through itself. The interweaving locks each interconnection point and prevents slipping of any of the lengths of line.

It will be apparent to those skilled in the art, that various changes may be made in form, detail, arrangements, and proportions of the parts described herein without departing from the spirit and scope of the invention. Accordingly, what is intended to be protected by Letters Patent is set forth in the appended claims.

I claim:

1. Halter apparatus for livestock comprising: nosepiece means for encircling the nose of an animal, said nosepiece means constructed from a first length of braided hollow core line interwoven into a double-line loop; headpiece means for extending around the head of the animal; sidepiece means for joining said nosepiece means to said headpiece means, said sidepiece means including a first sidepiece constructed at a second length of said line, said nosepiece means passed through said second length of line and one end of said second length of line passed through said nosepiece means for forming a first interwoven juncture, said first sidepiece including a loop formed by threading the other end of said second length of line back into the core for a predetermined distance, whereby said first sidepiece is a double interwoven line; said sidepiece means further including a second sidepiece, an upper portion of said headpiece means and said second sidepiece constructed of a third length of said line, said nosepiece means passed through said third length of line and one end of said third length of line passed through said nosepiece means for forming a second interwoven juncture, the other end of said third length of line threaded back into the core of said third length of line, whereby said second sidepiece and said upper portion is a double inter woven line; and yoke means and a lower portion of said headpiece means are constructed of a fourth length of said line, said yoke means including a linking loop for coupling to said nosepiece means and an interwoven section intermediate said linking loop and said lower portion, said lower portion including a pair of lower members, one of said pair of lower members interwoven at a third juncture with said first sidepiece, and the other of said pair of lower members interwoven at a fourth juncture with the common point of said second sidepiece and said upper portion means.

2. Halter apparatus for livestock, said apparatus being formed principally of a braided hollow core material and comprising a nosepiece for encircling the nose of an animal, said nosepiece including an interwoven double-line loop of said material, said nosepiece being constructed of a unitary length of said material formed into said double-line loop; headpiece means of said material for extending around the head of the animal, said headpiece means including an upper portion for passing over the head of the animal and a lower portion for passing under the head of the animal; sidepiece means of said material joining said nosepiece to said headpiece means; yoke means joining said nosepiece to said lower portion, said nosepiece being joined to said sidepiece means by an interwoven juncture of said material in which the material of said sidepiece means is divided and the material of said nosepiece extends therethrough, and the material of said nosepiece is also divided and the material of said sidepiece means extends therethrough to form an interwoven juncture fixedly attaching said nosepiece to said sidepiece means.

3. The device of claim 2 in which said sidepiece means includes a first sidepiece constructed of a second unitary length of said material and has one end joined to said nosepiece at a first interwoven juncture; said first sidepiece including a loop formed by threading the other end of said second length back into the core for a predetermined distance whereby said first sidepiece is a double interwoven line; said sidepiece means including a second sidepiece, said upper portion of said headpiece means and said second piece being constructed of a third unitary length of said material and joined at one end to said nosepiece at a second interwoven juncture, the other end of said third length being threaded back into the core of said material whereby said second sidepiece and said upper portion is a double interwoven line; and said yoke means and said lower portion are constructed of a fourth length of said material; said yoke means including a linking loop for coupling to said nosepiece and an interwoven section intermediate said linking loop and said lower portion; said lower portion including a pair of lower members, one of said pair being interwoven with said first sidepiece and the other of said pair being interwoven with the juncture of said second sidepiece and said upper portion.